US010718120B1

(12) United States Patent
Haney

(10) Patent No.: US 10,718,120 B1
(45) Date of Patent: Jul. 21, 2020

(54) SCAFFOLD TOOL BUCKET HOLDER

(71) Applicant: Wade Haney, Harrison, OH (US)

(72) Inventor: Wade Haney, Harrison, OH (US)

( * ) Notice: Subject to any disclaimer, the term of this patent is extended or adjusted under 35 U.S.C. 154(b) by 0 days.

(21) Appl. No.: 16/048,490

(22) Filed: Jul. 30, 2018

(51) Int. Cl.
*E06C 7/14* (2006.01)
*E04G 5/00* (2006.01)
*F16M 13/02* (2006.01)

(52) U.S. Cl.
CPC ............. *E04G 5/003* (2013.01); *E06C 7/14* (2013.01); *E06C 7/143* (2013.01); *F16M 13/022* (2013.01)

(58) Field of Classification Search
CPC ........ E04G 5/003; E04G 5/00; F16M 13/022; E06C 7/14; E06C 7/143; E06C 7/16; E06C 7/165
USPC .................. 248/215, 210, 211, 238
See application file for complete search history.

(56) References Cited

U.S. PATENT DOCUMENTS

| | | | | |
|---|---|---|---|---|
| 2,606,079 A | * | 8/1952 | White | E06C 7/16 182/121 |
| 2,720,436 A | * | 10/1955 | Covey | B60N 3/004 108/135 |
| 2,932,544 A | * | 4/1960 | Lambert | B60N 3/004 108/135 |
| 3,285,557 A | * | 11/1966 | Reda | E06C 7/14 248/210 |
| 3,642,239 A | | 2/1972 | Zeiler, Jr. | |
| 3,738,601 A | * | 6/1973 | Gehringer | E06C 7/14 248/210 |
| 4,212,371 A | * | 7/1980 | Gaviorno, Jr. | E06C 7/16 182/121 |
| 4,618,030 A | * | 10/1986 | Campbell | E06C 7/16 182/121 |
| 4,862,994 A | * | 9/1989 | Hughes, Sr. | E06C 7/14 182/122 |
| D318,390 S | | 7/1991 | Murray | |
| 5,158,023 A | * | 10/1992 | Allen | E04G 5/00 108/42 |
| 5,217,193 A | * | 6/1993 | Drucker | B44D 3/14 248/148 |
| 5,622,463 A | | 4/1997 | Testa | |
| 5,641,142 A | * | 6/1997 | Hanson | E06C 7/14 182/129 |
| 5,673,885 A | * | 10/1997 | Pham | E06C 7/14 182/129 |
| 6,026,601 A | * | 2/2000 | Kiel | A47B 5/00 108/47 |
| 6,044,930 A | * | 4/2000 | Hayman | E06C 1/34 182/107 |

(Continued)

*Primary Examiner* — Nkeisha Smith
(74) *Attorney, Agent, or Firm* — Mark F. Smith; Smith Brandenburg Ltd.

(57) ABSTRACT

A scaffold tool bucket holder for attaching and detaching to the side rail of a scaffold for supporting a bucket containing working materials and reduces or eliminates the risk of injury. The scaffold tool bucket holder comprises planar portion having a top surface and a bottom surface and an upwardly extending side wall along the peripheral of the top surface of the planar portion. The planar portion includes an opening adapted for receiving a bucket therein. Integrally formed along the back wall are attachment apparatus adapted to hook over a scaffold rail forming a frictional fit with the scaffold tray that is effective for maintaining the scaffold tool bucket holder in position on the scaffold rail.

15 Claims, 14 Drawing Sheets

(56) References Cited

U.S. PATENT DOCUMENTS

| | | | | |
|---|---|---|---|---|
| 6,131,699 A * | 10/2000 | Leak, Jr. | .................... | E06C 7/14 |
| | | | | 182/129 |
| 6,170,680 B1 * | 1/2001 | Hung | ..................... | A45D 44/02 |
| | | | | 211/119.007 |
| 6,467,744 B1 * | 10/2002 | Calin | ...................... | B25H 5/00 |
| | | | | 248/214 |
| 6,502,664 B1 | 1/2003 | Peaker, Sr. | | |
| D576,292 S * | 9/2008 | Brown | ........................ | D25/68 |
| 7,789,359 B2 * | 9/2010 | Chopp, Jr. | ............. | H02G 3/263 |
| | | | | 182/129 |
| 7,913,964 B1 * | 3/2011 | Kennedy | ................... | E06C 7/14 |
| | | | | 248/210 |
| 8,469,148 B2 * | 6/2013 | Perry | ....................... | E06C 7/14 |
| | | | | 182/122 |
| 8,636,144 B1 * | 1/2014 | Lawery | .................... | E06C 7/14 |
| | | | | 182/129 |
| 8,881,917 B1 * | 11/2014 | Sooknanan | ............. | B25H 3/06 |
| | | | | 211/133.3 |
| 8,919,715 B2 * | 12/2014 | Terada | ................. | A47B 96/028 |
| | | | | 108/115 |
| 8,925,685 B2 * | 1/2015 | Dufour | .................... | E06C 7/14 |
| | | | | 182/129 |
| 9,016,434 B2 * | 4/2015 | Moss | ........................ | E06C 1/22 |
| | | | | 182/106 |
| 9,567,804 B2 * | 2/2017 | Youlyahshiev | ........... | E06C 1/36 |
| 9,714,542 B1 * | 7/2017 | Harcz | ....................... | E06C 7/14 |
| 10,040,605 B1 * | 8/2018 | Popier | .................... | B65D 25/22 |
| 2008/0083583 A1 * | 4/2008 | Gibson | .................... | E06C 7/14 |
| | | | | 182/108 |

* cited by examiner

SCAFFOLD TOOL BUCKET HOLDER

BACKGROUND OF THE INVENTION

The subject invention is directed to a scaffold tool bucket holder and more particularly, to a scaffold tool bucket holder for use in construction that attaches to a rail of scaffold that can be used in areas having a minimal amount of space, that eliminates or reduces the likelihood of injury to a user during normal use of the scaffold tool bucket holder by a worker, that provides improved strength necessary for supporting objects and is constructed such that it significantly reduces manufacturing costs of the scaffold too bucket holder.

Workers performing construction, such as carpenters, electricians, painters, brick layers and the like, often work on ladders and scaffolds and it is desirable to have means for assisting the worker in holding objects, such as a paint bucket, in position for easy access to complete various tasks. Further, scaffolds often must be placed in positions with limited clearance thus providing little room for workers. Such limited work space must accommodate at least one work as well as work material or product being installed and the various tools required to performing the work. For many construction projects, a variety of tools are often required and it is inconvenient and time consuming for a worker to climb down and back up a scaffold to obtain a necessary tool. Accordingly, it is desirable to have a tool holder that is capable of supporting a variety of tools necessary for performing the work of the worker.

In order for workers to have the necessary tools for performing a job, they often carry tools and supplies in a conventional five-gallon bucket that are prevalent in the construction industry such as buckets typically used for holding paint, plaster, drywall mud and the like. Such buckets are cylindrical in shape and have a wire carrying handle with a removable lid. Indeed, many products are available that are designed to fit into or over the bucket's rim to serve as pockets or tool organizers and holders. Unfortunately, while such buckets are effective tool holders, given the limited floor space on most scaffolds, it is undesirable for them to be placed on the floor of the scaffold. In addition, resting the bucket on the floor of the scaffold requires the worker to constantly bend over to retrieve the right tool from the bucket. In addition, resting the bucket on the floor of the scaffold often results in the bucket being tipped over by a worker's leg which can result in tools falling out of the bucket and falling to the ground below. Accordingly, workers often attach the buckets to a side rail of a scaffold using the wire handle of the bucket and a wire or cord which can break or come untied creating a safety hazard. Further, such attachment makes it difficult for the worker to move the bucket to other locations along the scaffold. Further, the wire handle of the bucket is not designed for support heavy weights and can break, bend or pull off the bucket again creating a safety hazard.

While bucket supports have been developed for attaching to a side rail of a scaffold, such supports have been found to be relatively flimsy and are not acceptable for repeated use. Further, as illustrated in FIG. 1, bucket supports, such as shown, are made of metal which make them somewhat heavy to lift to a substantial height or carry as a worker climbs up a scaffold. Further, because scaffold walking space is often very limited and many times occupied by more than one worker who is handling various tools and equipment, a worker will often accidently contact a scaffold tool holder. Unfortunately, prior art bucket supports have relatively sharp corners and edges which can scratch, cut or poke a worker if the worker accidently makes contact with the edge or a corner of the holder. Such contact can result in the worker dropping a tool or working material that can damage the tool or working material or cause danger to those below and near the scaffold. Further, the injury may also require the worker to climb down the scaffold for treatment which reduces work time. In addition, such tool holders have workers often have foldable hinges and struts (braces) that add the cost of manufacture and which, if the worker is concentrating on the work to be performed and not paying careful attention in folding or unfolding the tool holder, significantly increases the likelihood that a worker will pinch a finger causing injury to the worker. Another problem with many conventional tool holders, such as shown in FIG. 1, is that the apparatus for attaching the holder to a scaffold rail is designed for a specific size and geometrically shaped scaffold rail and is either unable to be adjusted to accommodate a different size or geometrically shaped scaffold rail or is unable to provide a secure and rigid connection to the scaffold rail.

Given the common use of buckets for holding tools by workers on scaffolds and the associated hazards associated with attaching the buckets to the scaffold, there is a need for a scaffold tool holder that can be easily attached and adjusted to provide a secure attachment to various sized scaffold rails and can be easily removed from the scaffold rail, that provides a sturdy support for a tool bucket, that is economical to manufacture, is relatively light weight, and has no sharp edges, corners or pinching points that can cause injury to the worker during use or during installation or removal of the scaffold tool bucket holder.

SUMMARY OF THE INVENTION

The subject invention is a scaffold tool bucket holder that can be easily attached and detached to a rail of a scaffold, that provides a sturdy support for supporting a bucket containing tools and/or liquid, and the like, and reduces or eliminates the risk of injury. In a preferred embodiment, the scaffold tool bucket holder of the subject invention comprises a base platform having an upwardly extending side wall along the peripheral of the base platform. The base platform includes an opening adapted for receiving a bucket therein. Integrally formed along the upwardly extending side wall is a rail attachment apparatus, such as in the form of one or more J-shaped hooks, adapted to extend over a scaffold rail forming a secure fit with the scaffold and is effective for maintaining the scaffold tool bucket holder in position on the scaffold rail. The base platform and the attachment apparatus are formed such that all of the exposed edges and corners are sufficiently rounded such that they will not injure a worker if the worker scrapes or pushes against an edge or corner.

In a preferred embodiment of the invention, the scaffold tool bucket holder includes a stabilizing member for providing additional support for the base platform; wherein the base platform and the stabilizing member have no sharp edges (surfaces) or corners that can cause injury to a worker if the worker scrapes an edge or pushes against an edge or corner.

In a preferred embodiment of the invention the upwardly extending side wall and any internal compartment walls are formed such that exposed corners and edges are sufficiently rounded so that a worker that scrapes an edge or pushes against an edge or corner will not be injured.

In a preferred embodiment of the invention the rail attachment apparatus is in the form of one or more hooks extending upwardly from the upwardly extending side wall and operates to extend over the rail of the scaffold and has a rounded top surface and side edges such that a worker will not be injured if the worker scrapes and edge.

In a preferred embodiment of the invention the rail attachment apparatus includes a flexible flap that operates to press against the rail such that the rail attachment apparatus can accommodate various size rails while providing pressure against the rail to form a secure fit.

In a preferred embodiment of the invention the rail attachment apparatus includes an inner ridge that operates to create a snap fit for allowing the scaffold rail to be engaged with the rail attachment apparatus and allows the scaffold rail to disengage from the rail attachment apparatus for removing the scaffold tool bucket holder from the scaffold rail.

In a preferred embodiment of the invention the rail attachment apparatus is in the form of one or more hooks having an inner flexible padding that operates to provide a press fit for securing the rail attachment apparatus to the rail of the scaffold.

In a preferred embodiment of the invention the rail attachment apparatus is in the form of one or more hooks have a flexible flap that operate to press against the rail of the scaffold to improve the hook's ability to accommodate different size rails and make a secure connection with the scaffold rail.

In a preferred embodiment of the invention the top edge of the upwardly extending side wall and top edge of any internal compartment walls include padding material that operates to provide a pliable blunt surface.

In a preferred embodiment of the invention the stabilizing member comprises a pair of support rails attached to the planar surface and a pair of stabilizing rails coupled to the corresponding support rails, wherein the stabilizing rails having a use position such that the stabilizing rails extend downwardly from the support rails and a storage position such that the stabilizing rails are parallel to the support rails.

In a preferred embodiment of the invention the stabilizing rails are rotatably coupled to the support rails such that the stabilizing rails rotate from the use position to the storage position.

In a preferred embodiment of the invention wherein the base platform is formed from a plastic material.

In a preferred embodiment of the invention the planar surface of the base platform includes a magnetic material that operates to keep working materials in place on the planar surface.

In another preferred embodiment of the invention the scaffold tool bucket holder for attaching to a rail of a scaffold comprises a base platform formed from a plastic material and having a planar surface and an opening therein and an upwardly extending side wall extending around the outer periphery of the planar surface; a rail attachment apparatus that operates to attach to scaffold tool bucket holder to the rail of the scaffold; and a stabilizing member for providing additional support for the base platform; wherein the upwardly extending side wall has rounded exposed corners and a rounded top edge; wherein the rail attachment apparatus is in the form of one or more hooks having a rounded top surface and projects upwardly from the upwardly extending side wall and operates to extend over the rail of the scaffold; wherein the rail attachment apparatus includes at least one closure element that operates to removably couple the rail attachment apparatus to the scaffold rail and further operates to allow the rail attachment apparatus to accommodate various size rails; wherein the top edge of the upwardly extending side wall includes padding material that operates to provide a pliable blunt surface; wherein the stabilizing member comprises a pair of support rails attached to the underside surface of the planar surface and a pair of stabilizing rails coupled to the corresponding pair of support rails; and wherein the stabilizing rails having a use position such that the stabilizing rails extend downwardly from the underside surface of the planar surface and a storage position such that the stabilizing rails are parallel to support rails.

Other aspects, advantages, and embodiments of the invention will be apparent from the following description, the accompanying drawings and the appended claims.

BRIEF DESCRIPTION OF THE DRAWINGS

Features, aspects, and advantages of the present invention will become better understood with regard to the following description, appended claims, and accompanying drawings where:

DETAILED DESCRIPTION OF THE INVENTION

The scaffold tool bucket holder of the subject invention operates to be positioned on an upper rail of a scaffold for supporting a tool bucket used for holding a liquid, such as paint, or a plurality of tools. Preferably, the bucket is a conventional and commercially available bucket having about a three-gallon capacity to an about seven-gallon capacity with a cylindrical-shaped side wall which tapers slightly downward towards a bottom wall. The bucket typically includes at least one mid-level rib which extends horizontally around the side wall. The scaffold tool bucket holder when in position extends horizontally away from (outwardly) the scaffold so that it does not interfere with a worker walking along the length of the scaffold. It should be apparent the scaffold tool bucket holder can be positioned anywhere along the scaffold's length and that one or more scaffold tool bucket holders can be positioned on the same rail or different rails if desired. It should also be understood that the scaffold tool bucket holder can also be positioned so that it extends inwardly from a rail so as to overhang the scaffold's walking surface.

As used herein the terms "upward" or "upwardly" refer to the direction vertically away from the walking surface of the scaffold. The terms "downward" or "downwardly" refer to the direction vertically towards the walking surface of the scaffold. As used herein the terms "horizontal" or "horizontally" refers to the direction parallel to the walking surface of the scaffold. As used herein the term "outwardly" refers to the direction horizontally away from the walking surface of the scaffold and the term "inwardly" refers to the direction horizontally towards the walking surface of the scaffold. The term "exposed" as used herein refers to a surface that a worker would likely make direct contact with when using the scaffold tool holder. The term "corner" as used herein refers to the junction of two surfaces forming an edge along the junction. The term "rounded" refers to a smooth curved surface that is sufficiently blunt or dull such that a worker can run his/her hand along the surface and exerting a force or pressure against the surface that would reasonably exerted by a worker working on a scaffold against a surface of a scaffold tool holder and not experience an injury, such as a cut or puncher to the skin of the worker or a painful poke. For an illustrative example there are no sharp edge that could cause injury to a worker if the worker scrapes against the rounded edge or corner or if the worker is pushed against and contacts an edge or corner, such as when a worker moves past the scaffold tool bucket holder or backs up into a corner of the scaffold tool bucket holder.

Figure 2:
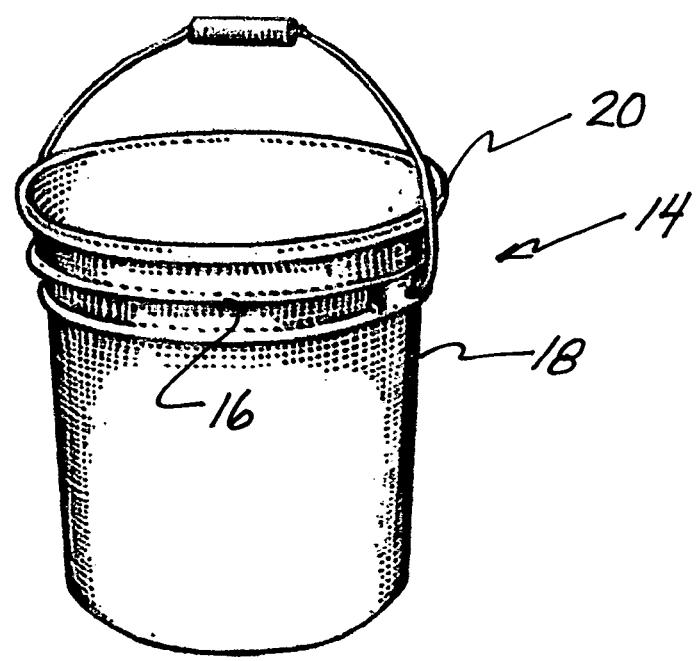
FIG. 2 is a schematic representation of a conventional bucket typically used for containing a liquid, such as paint, having outwardly tapered side walls extending from a case and having an upper rib for receiving and mating with a lid and a mid-level rib.
Figure 3:
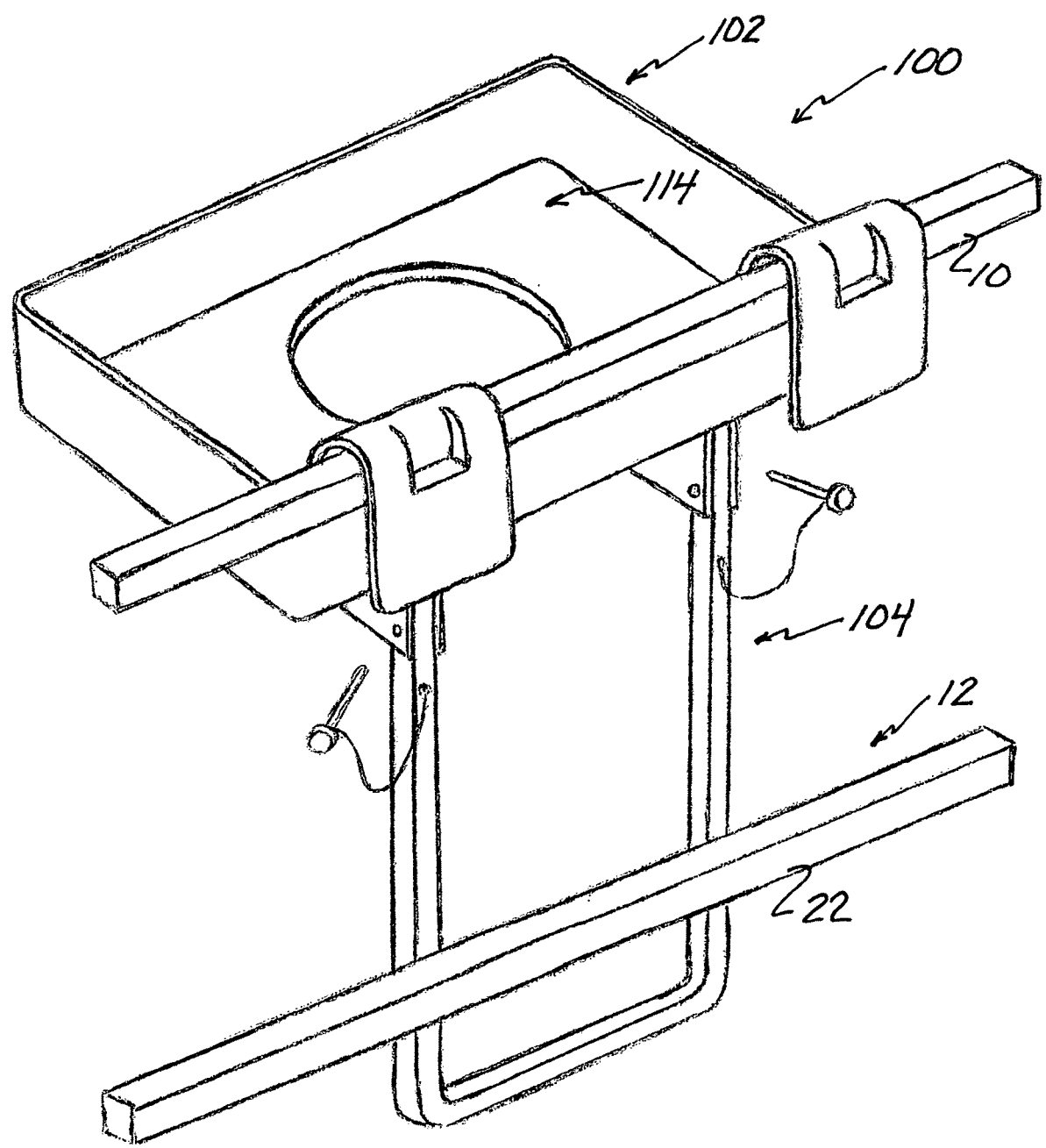
FIG. 3 is a schematic representation of the scaffold tool bucket holder of the subject invention having a base platform and a stabilizing member and is positioned on the upper rail of a scaffold by a rail attachment apparatus, wherein the stabilizing member is shown contacting a lower scaffold rail for providing additional stability to the scaffold tool bucket holder.
Figure 4:
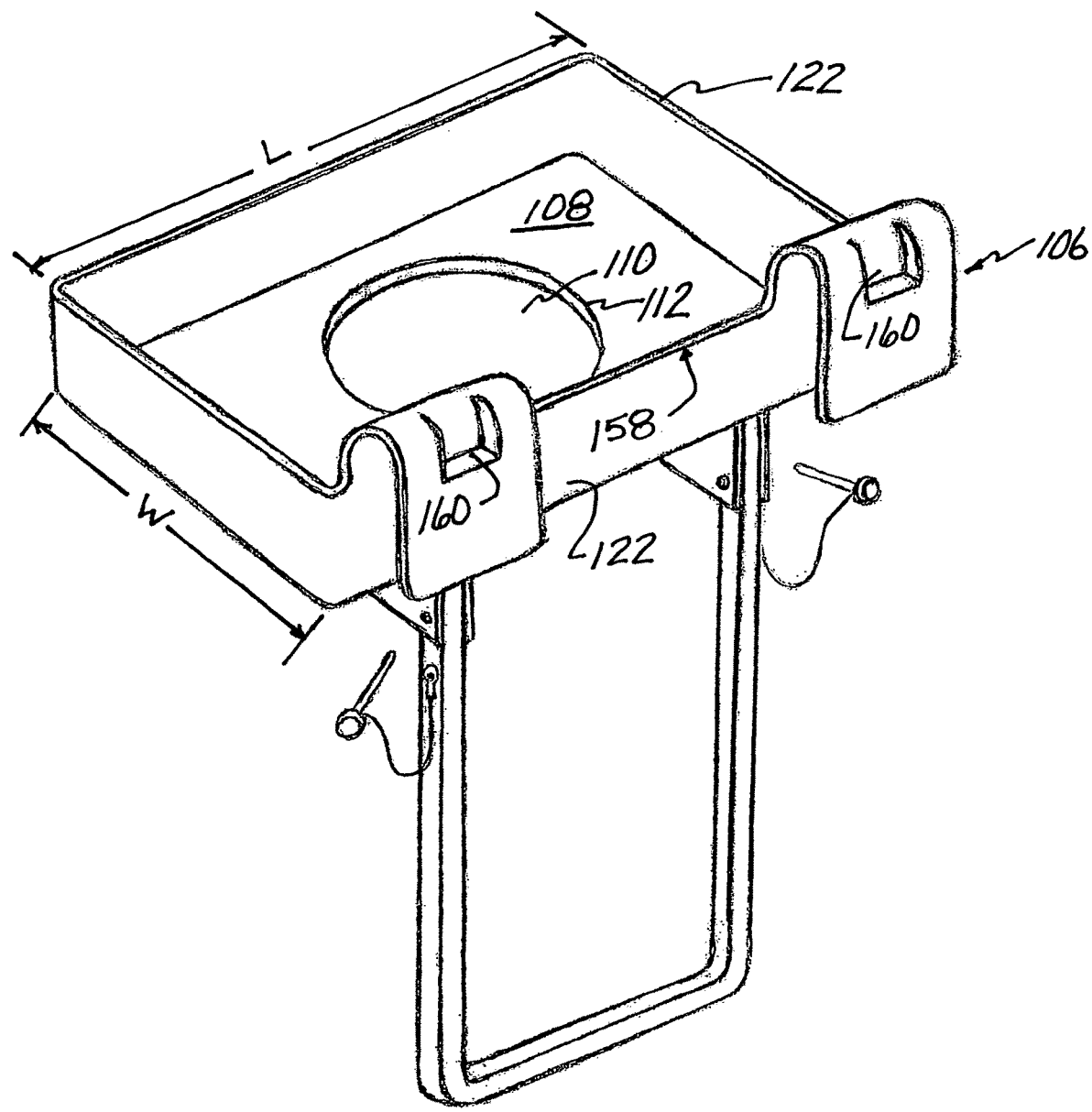
FIG. 4 is a schematic representation of a preferred embodiment of the scaffold tool bucket holder of the subject invention showing the base platform having an opening and an upwardly extending side wall and the stabilizing member is shown in its use position.

As shown in FIGS. 3 and 4, the scaffold tool bucket holder 100 of the subject invention comprises a base platform 102, a stabilizing member 104 and a rail attachment apparatus 106 for attaching the scaffold tool bucket holder 100 to an upper rail 10 of a scaffold 12. The base platform 102 has a planar surface 108 with an opening 110 extending through it. Preferably, the planar surface 108 is rectangular-shaped having a length L and a width W between about fifteen inches to about twenty-four inches. It should be understood however, that other geometrically shaped planar surfaces, such as but not limited to, square-shaped, oval shaped, round-shaped and other geometrically shapes can be utilized. The opening 110 has a diameter sized to receive a large capacity bucket 14 (FIG. 2) such that when the bucket 14 is lowered vertically downwardly into the opening 110 the bucket's mid-level rib 16, which has an outer diameter that is greater than the diameter of the opening 110, contacts the peripheral upper edge 112 of the opening 110 thereby preventing further downward movement of the bucket 14 through the opening 110 and securely held in position within the opening 110. It should also be understood that for buckets not having a mid-level rib, the bucket is lowered vertically downwardly into the opening 110 until the bucket's outwardly tapered side wall 18 contacts the peripheral upper edge 112 of the opening 110 thereby forming a frictional fit between the peripheral upper edge 112 of the opening 110 and the side wall 18 of the bucket 14 to hold the bucket 14 securely in position within the opening 110. Preferably, the diameter of the opening 110 is about ten inches to about fourteen inches so that it accommodates most tool buckets (conventional buckets) contemplated for use with the scaffold tool bucket holder of the invention. In a preferred embodiment of the invention, the planar surface 108 of the base platform 102 includes a magnetic material layer 114 (FIG. 3), such as a film or mat, that operates to keep working materials in place on the base platform 102.

Figure 6:
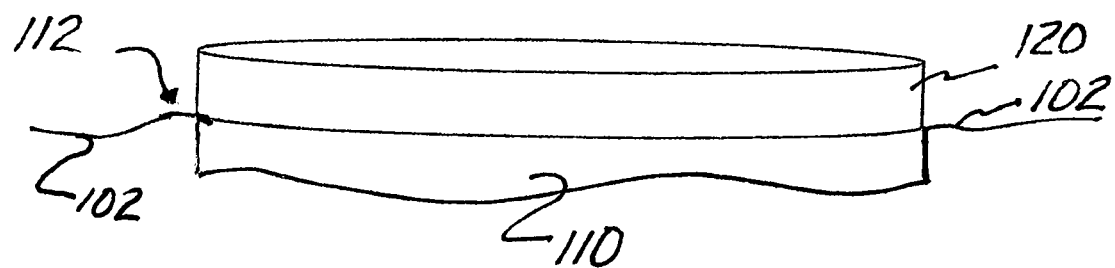
FIG. 6 is a schematic representation of another embodiment of the scaffold tool bucket holder of the subject invention having a base platform and an opening with an upwardly extending rim.
Figure 7:
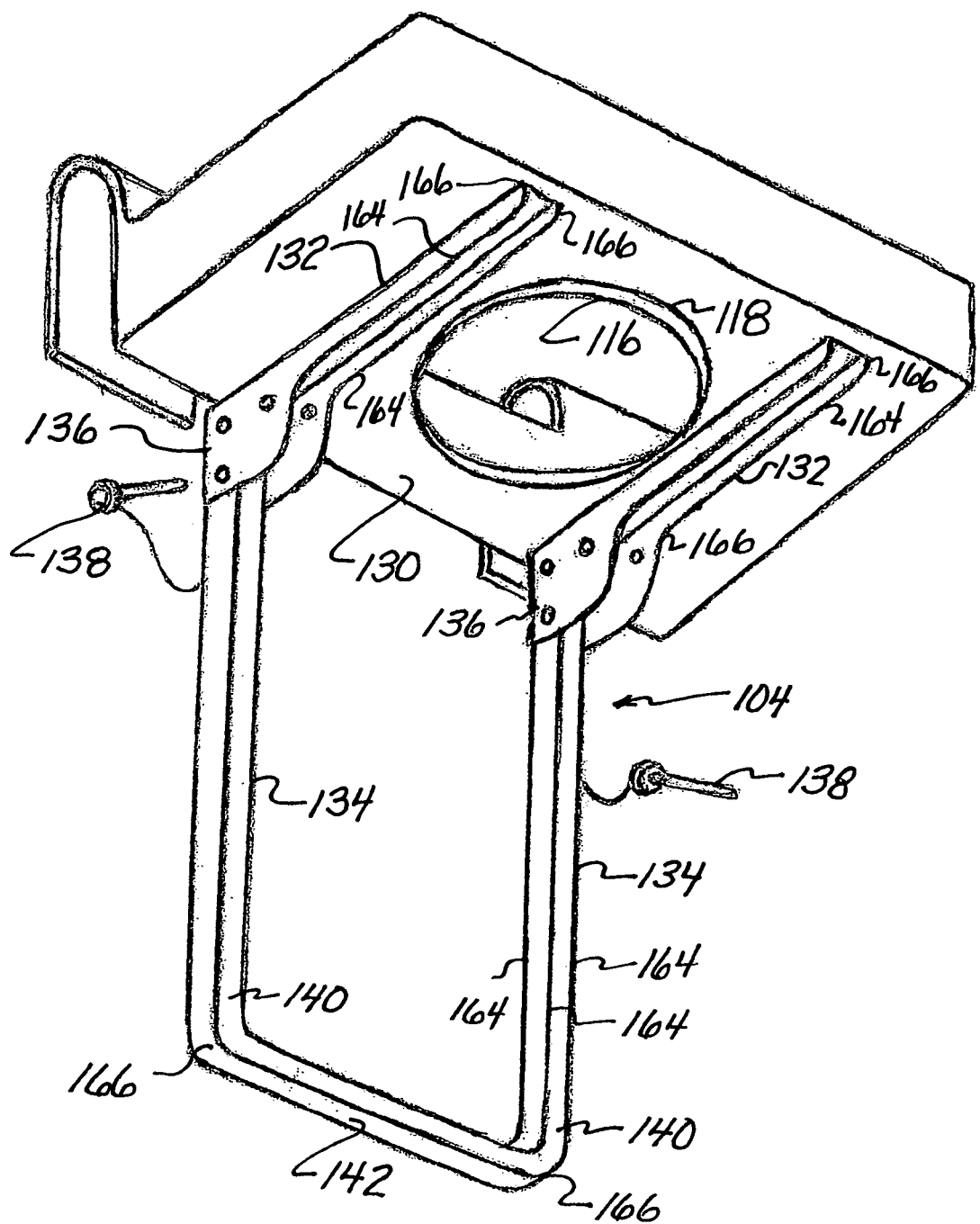
FIG. 7 is a schematic representation of a preferred embodiment of the scaffold tool bucket holder showing a base platform having an opening with a downwardly extending rim and the stabilizing member is shown having a pair of support rails pivotally mounted to a pair of stabilizing rails, wherein the stabilizing rails are shown in their extended use position such that the stabilizing rails extend downwardly and perpendicular to the support rails.

In a preferred embodiment, as shown in FIG. 7, a downwardly extending rim 116 surrounds the opening's peripheral lower edge 118 and operates to give additional structural support to the base platform 102 and provides anchoring for other items, such as a top section cutout of a conventional bucket, which can be used to prevent or reduce the probability that work materials, such as tools, nails, screws, bolts, etc. will fall through the opening 110. In another preferred embodiment of the invention, as shown in FIG. 6, the base platform 102 is provided with an upwardly extending rim 120 surrounding the opening's peripheral upper edge 112 and operates to provide a wall for preventing or reducing the probability that work materials will fall through the opening 110 when a bucket is removed or not in position within the opening 110. Preferably, the upwardly extending rim 120 is tapered inwardly towards the center of the opening 110 such that when a bucket 14 is placed in position within the opening 110 the upwardly extending rim 120 is positioned under the upper rim 20 of the bucket 14 (FIG. 2) which operates to form a tighter or a more wobble-free support of the bucket. In a preferred embodiment, the top diameter of the upwardly extending rim 120 is larger than its bottom diameter (at the level about equal to the level of the planar surface) and equal to the diameter of the tool bucket's upper rim 20 such that a bucket's lid (not shown) can be placed over to mate with the upwardly extending rim 120 thereby covering the opening 110 and creating a larger planar surface which can support loose work materials as well as preventing items, such as work materials from falling through the opening when the bucket is not in position within the opening.

Figure 11:
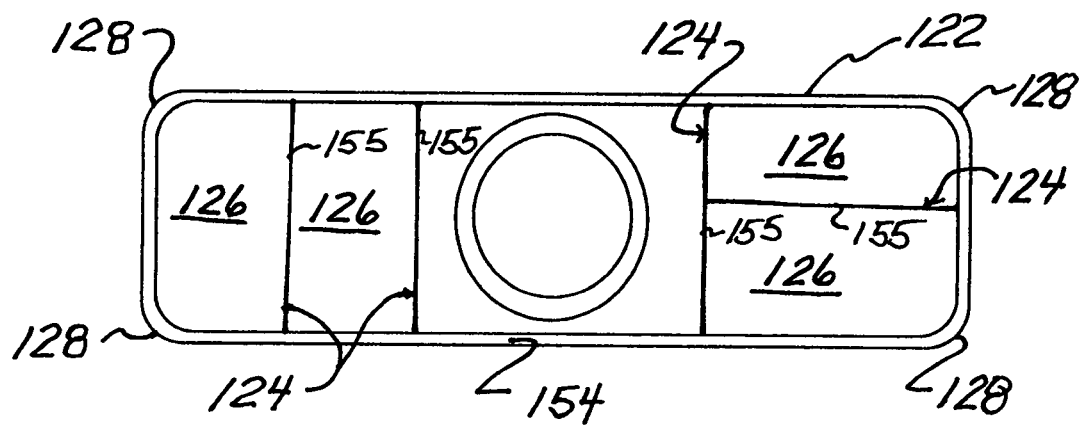
FIG. 11 is a schematic representation of another preferred embodiment of the invention showing the base platform having internal compartment walls that cooperate with the upwardly extending side wall of the base platform to form one or more compartments.

As illustrated in FIG. 4, the base platform 102 further comprises an upwardly extending side wall 122 extending around the outer periphery of the planar surface 108. The upwardly extending side wall 122 operates to maintain any work materials placed on the planar surface 108 from sliding off the planar surface. Preferably, the upwardly extending side wall 122 is about three inches to about five inches in height, however, it should be understood that the upwardly extending side wall 122 can be lower or taller in height. In another preferred embodiment, the scaffold tool bucket holder 100 can include one or more internal upwardly extending compartment walls 124, such as shown in FIG. 11, that cooperate with the upwardly extending side wall 122 to form one or more internal compartments 126. As shown in FIG. 11, the base platform 102 is formed such that all of its exposed corners 128 are rounded. In addition, all the exposed edges 155 of the base platform, such as, but not limited to the corner or edge formed by the underside surface 128 of the base platform 102 and the upwardly extending side wall 122, the top edge 154 of the upwardly extending side wall 122 and the top edge 155 of any internal compartment walls 124, are rounded.

Figure 8:
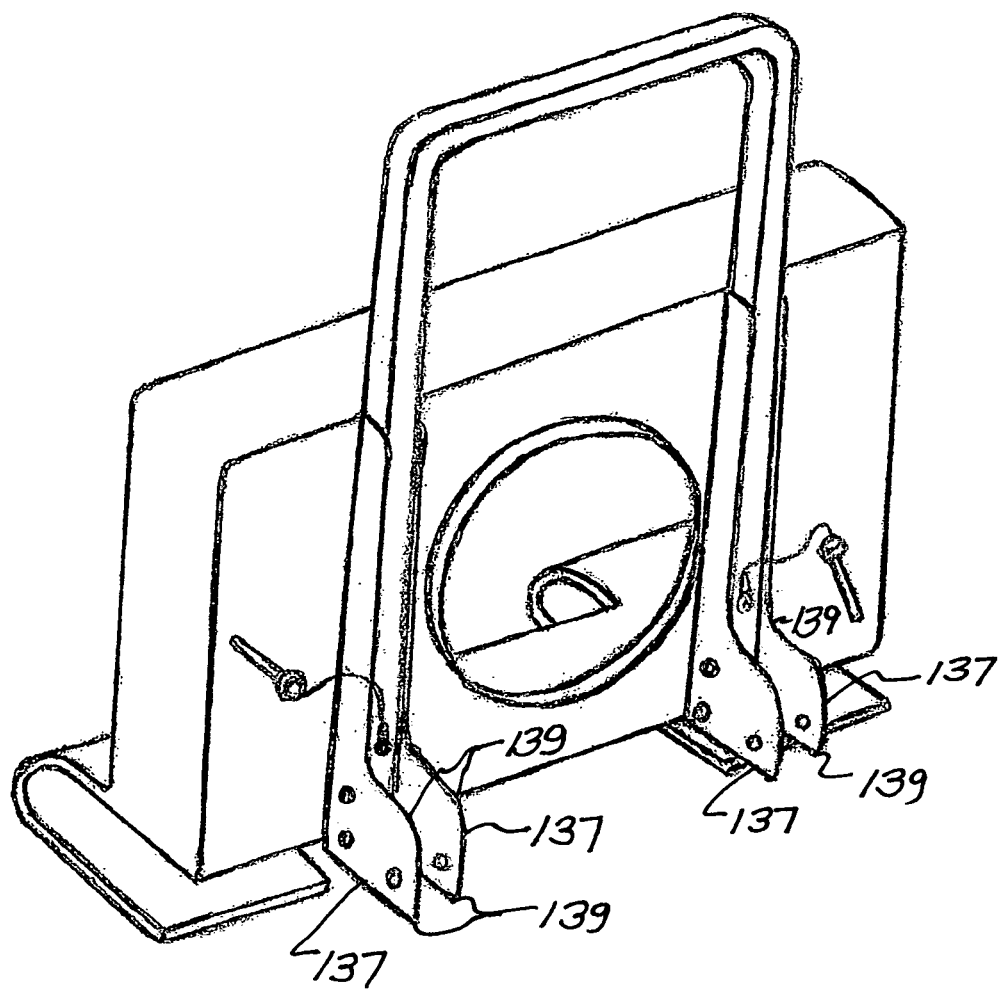
FIG. 8 is a schematic representation of a preferred embodiment of the invention showing the stabilizing member having a pair of support rails pivotally attached to a pair of stabilizing rails, such that the stabilizing rails are shown in their folded storage position such that the stabilizing rails are nested within and parallel with corresponding support rails.

Referring to FIGS. 7 and 8, the scaffold tool holder 100 is shown such that the stabilizing member 104 is mounted to the underside surface 130 of the base platform 102 by a pair of parallel support rails 132. It should be understood that the support rails 132 are attached to the underside surface 130 of the base platform 102 by various conventional means, such as by screws, bolts, adhesives, solder and the like or can be formed integral with the base platform. Mounted to the support rails 132 is a stabilizing member 104 in the form of parallel stabilizing rails 134. As shown, the support rails 132 preferably include webs 136 that are preferably formed integrally with the support rails 132 and are attached to the stabilizing rails 134. In a preferred embodiment, as illustrated in FIG. 7, the stabilizing rails 134 are pivotally coupled to the webs 136 forming pivotal hinges, such as conventional pin hinges as shown, having locking pins 138 for locking the stabilizing rails 134 in position with respect to the pair of support rails 132. Attaching the stabilizing member 104 such that it can pivot from a use position (FIG. 7) into a storage position (FIG. 8) operates to permit the scaffold tool bucket holder of the subject invention to be placed in a configuration for ease of transporting and for storage. As shown in FIG. 8, the exposed web edges 137 and corners 139 are rounded. While the pivotal hinges described above provide easy to use and easy to manufacture system, it should be understood that any of various commercially available hinges for pivoting the stabilizing rails with respect to the support rails and having rounded and/or padded exposed edges and corners can also be used, including certain butt hinges, strap hinges, piano hinges, and living hinges. Further, specialized hinges or attachment systems which allow the stabilizing rails to be placed about ninety degrees with respect to the underside surface of the base platform can also be utilized to add support and to help hold the base platform horizontally level with respect to the scaffold while the scaffold tool holder is mounted on the scaffold rail.

As shown, in a preferred embodiment, each support rail 132 has a U-shaped cross section such that the stabilizing rails 134 can pivot into a storage position (as shown in FIG. 8) such that the stabilizing rails 134 are nested within and aligned parallel with corresponding support rails 132. The stabilizing rails 134 can then rotate into a use position (as shown in FIG. 7) where the stabilizing rails 134 are aligned perpendicular to the support rails 132 such that they extend downwardly from the underside surface 130 of the base platform 102. Preferably, the lower ends 140 of the stabilizing rails 134 are attached to a cross rail 142 which operates to provide additional rigidity and stability to the stabilizing rails 134 forming a U-Shaped structure. Preferably, the support rails 132 are formed from mill finished aluminum thus requiring no top coat or powder coat finish to prevent corrosion and the stabilizing rails are formed from a single extruded tube thereby requiring no welding of separate parts to create the stabilizing member. However, in another preferred embodiment the support rails 132 are formed integral with the underside surface of the base platform.

Figure 9:
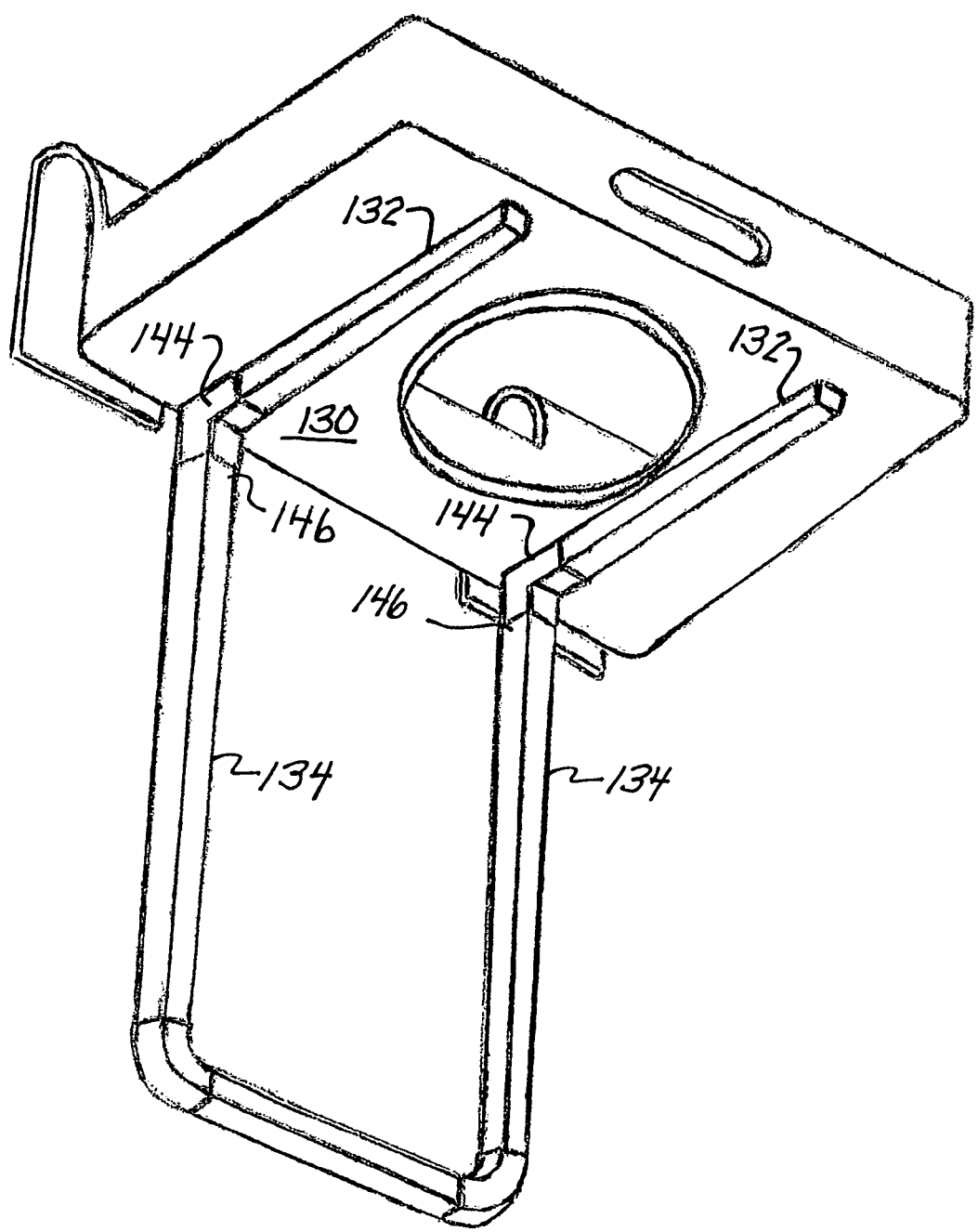
FIG. 9 is a schematic representation of another preferred embodiment of the scaffold tool bucket holder showing a stabilizing member having a pair of stabilizing rails removably and rigidly mounted to a pair of support rails and are shown in their extended use position such that the stabilizing rails extend downwardly and perpendicular to the support rails.
Figure 10:
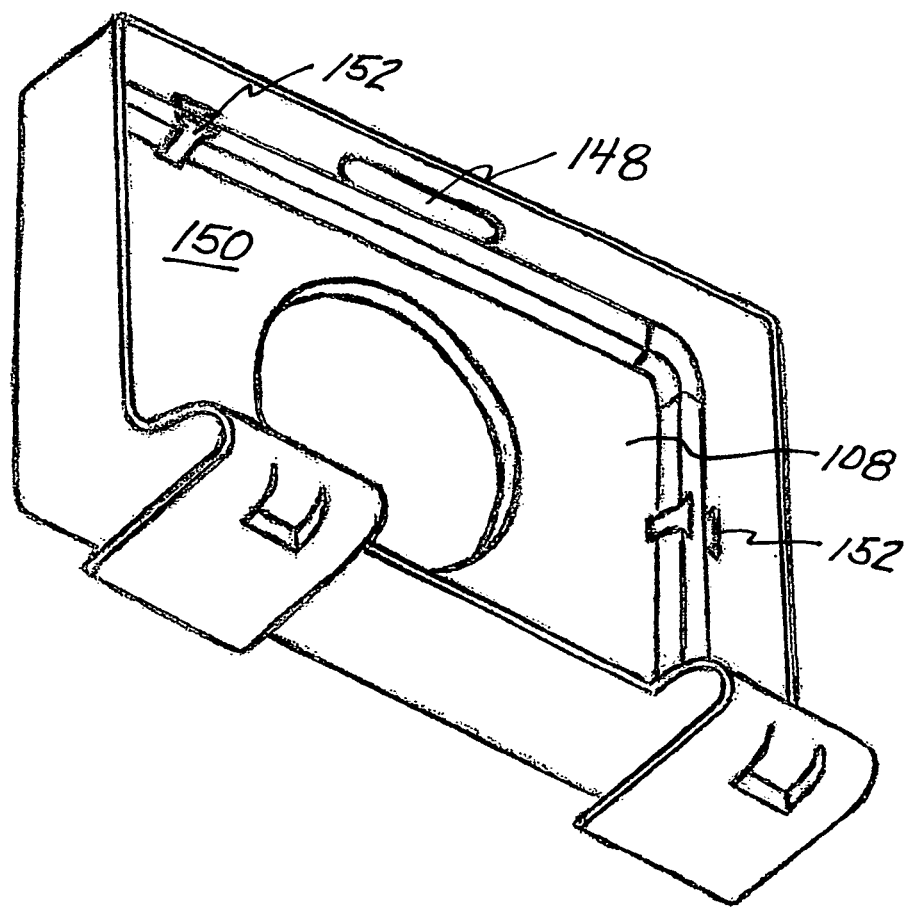
FIG. 10 is a schematic representation of a preferred embodiment of the invention showing the stabilizing member of FIG. 9 showing the stabilizing rails are disengaged from the pair of support rails and are mounted along the base platform in their storage position.

In another preferred embodiment, as illustrated in FIG. 9, the stabilizing rails 134 are slidably coupled to the support rails 132 by non-rotating mounts 144 which are locked into position such that the stabilizing rails 134 are positioned so that they extend generally downwardly from the underside surface 130 of the base platform 102 when the scaffold tool bucket holder is in position attached to the rail of the scaffold. Preferably, the non-rotating mounts 144 have a generally L-shaped configuration such that the upper ends 146 of the stabilizing rails 134 slide into engagement with one end of the non-rotating mounts 144 and preferably secured in place by pins (not shown) so that the stabilizing rails 134 are in their use position, as shown in FIG. 10. The scaffold tool bucket holder can be placed into its storage configuration by removing the stabilizing rails 134 by sliding the out of engagement with the non-rotating mounts 144 and, as illustrated, the top surface 150 of the planar surface 108 includes clips 152 that operate to removably attaching to the removed stabilizing rails 134 to place and maintaining the rails in their storage position. Preferably, the upper extending side wall 122 is also provided with an opening 148 that operates as a handle for carrying the scaffold tool bucket holder when it is in its storage position for transport.

As illustrated in FIG. 3, when the scaffold tool bucket holder 100 is mounted to a rail 10 of a scaffold 12, the stabilizing rails 134 of the stabilizing member 104 extend downward and together with the support rails 132 operate to hold the base platform 102 in a horizontal position when the scaffold tool bucket holder is attached to the rail 10 of a scaffold 12. In a preferred embodiment of the invention, the stabilizing of rails 134 have a length sufficiently long to make contact with an immediately lower scaffold rail 22 thereby providing additional stability and support to the scaffold tool bucket holder 100, such as by preventing the scaffold tool bucket holder from rotating with respect to the rail of the scaffold by bearing against a lower scaffold rail. It should also be understood that the all of the exposed edges 164 and corners 166 of the support rails 130 and the stabilizing rails, including the cross rail 144, are rounded (FIG. 7).

In a preferred embodiment of the invention, the base platform, the support rails and the stabilizing rails are rigid in nature and in a preferred embodiment of the invention are preferably made of plastic to reduce weight and manufacturing costs. For example, the base platform, support rails are formed by plastic mold procedures either as individual components or as a unitary structure. However, it should be understood that while more expensive and having increased weight, the base platform and stabilizing member may also be made of a metal such as steel or aluminum, composite, wood or any other material which is capable of withstanding the rigors of heavy-duty use experienced under the weather extremes of cold and hot.

Figure 12:
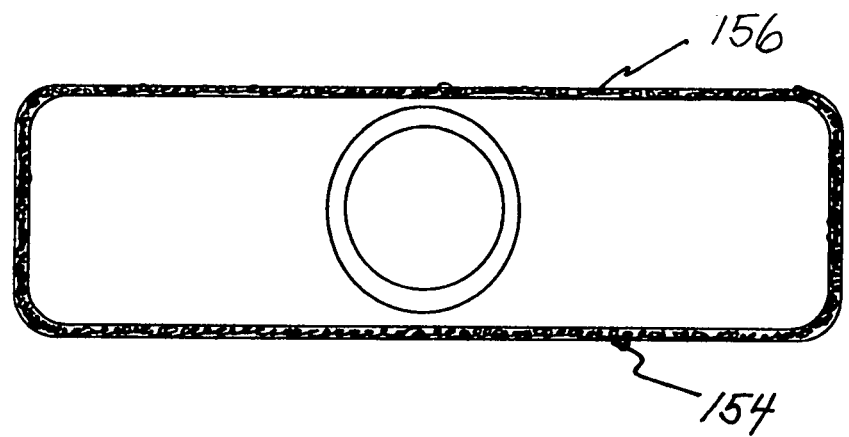
FIG. 12 is a schematic representation of another preferred embodiment of the invention of a planar view of the top edge of the upwardly extending side wall of the base platform having padding material thereon.
Figure 13:
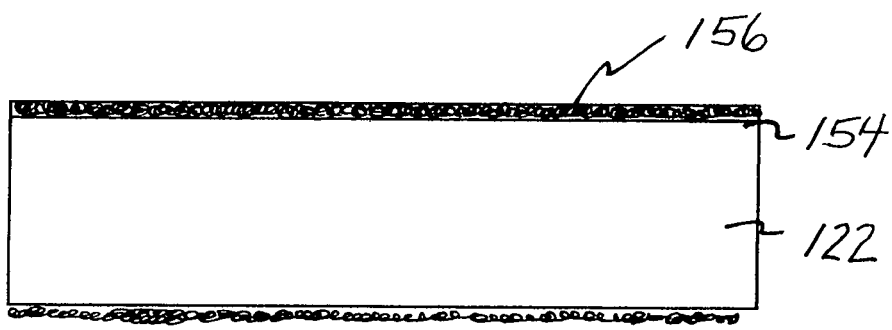
FIG. 13 is a schematic representation of the side view of the top edge of the upwardly extending side wall of the base platform of FIG. 12 having a padding material thereon and the bottom peripheral edge of the underside surface of the base platform having a padding material thereon.

As previously stated and as shown in FIGS. 12 and 13, the upwardly extending side wall 122 has a top edge 154 is rounded thereby eliminating sharp edges which can cause injury to a worker. The upper extending side wall 122 further includes all rounded outside corners 128 that further reduces sharp surfaces that potential can cause injury to a worker. In another preferred embodiment, as illustrated, the top edge 154 of the upwardly extending side wall 122 (and preferably the top edge 165 of any internal compartment walls 124) includes a padding material 156, such as a foam, plastic, rubber or other such material, that operates to further blunt the top edge 154 of the of the outwardly extending side wall 122 (and/or the top edge 155 of the internal compartment walls 124) thereby further eliminating or reducing the likelihood of injury to a worker.

Figure 5:
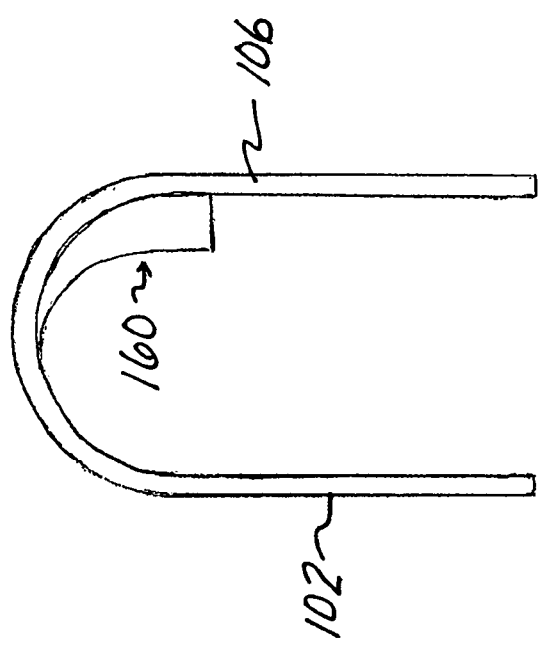
FIG. 5 is a schematic perspective representation of a preferred embodiment of the rail attachment apparatus in the form of a J-shaped hooks.
Figure 14:
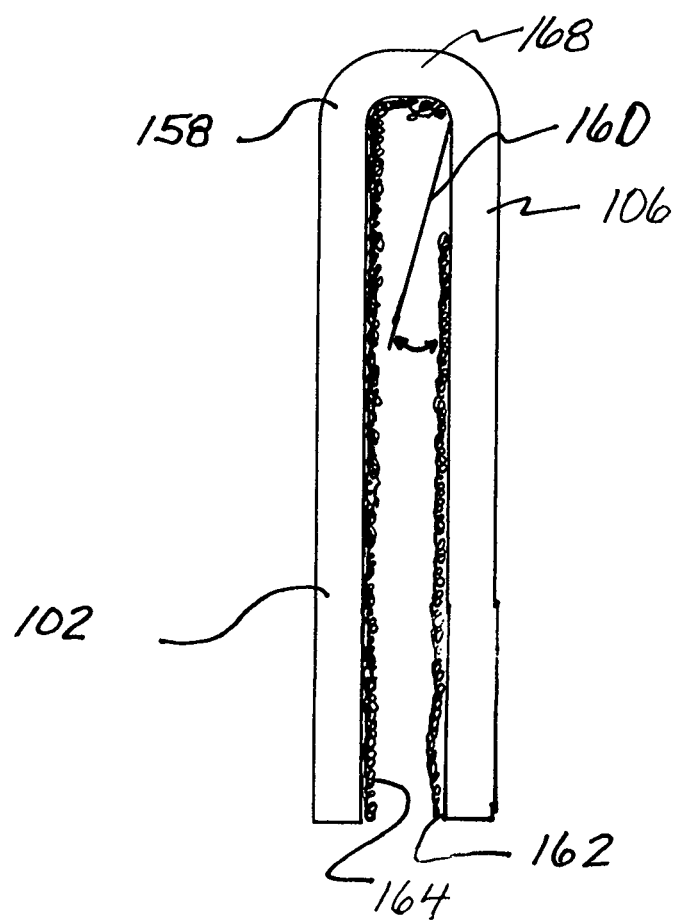
FIG. 14 is a schematic representation of another preferred embodiment of the invention showing the bottom peripheral edge of the underside surface of the base platform having a rounded corner.

Referring to FIGS. 3 and 4, in a preferred embodiment of the invention, the rail attachment apparatus 106 for attaching the scaffold tool bucket holder 100 to an upper rail 10 of a scaffold 12 is shown in the form of one or more J-shaped hooks integrally formed with the upper portion 158 of the upwardly extending side wall 122 having rounded exposed attachment surfaces 168 (FIG. 14). In a preferred embodiment, each J-shaped hook has a closure element 160 in the form of an inner flexible flap extending inwardly towards the upwardly extending side wall 122 that operates to press against the surface of the upper rail 10 to enable the rail attachment apparatus 106 to better accommodate various size scaffold rails and provide a more secure fit. It should be understood that the rail attachment apparatus in the form of J-shaped hooks can be attached to the upwardly extending side wall 122 by other means such as, but not limited to screws, rivets, solder and other like means. In another preferred embodiment of the invention the closure element 160 is in the form of flexible padding 164 positioned along the inner surface 162 of the rail attachment apparatus 106, as shown in FIG. 14, that operates to provide a press fit to better accommodate and more securely attach the rail attachment apparatus 106 to the upper rail 10 of the scaffold 12. It should now be apparent that the closure element operates to permit the scaffold tool bucket holder of the subject invention to allow the rail attachment apparatus to attach and create a snug fit on various sizes of scaffold rails, In another preferred embodiment of the invention, as illustrated in FIGS. 4 and 5, the rail attachment apparatus 106 is in the form of one or more J-shaped hooks each having a closure element 160 in the form of an inwardly extending towards the upwardly extending side wall 122 that operates to create a snap fit that engages with the rail 10 of the scaffold 12 to couple the rail with the rail attachment apparatus and for disengaging the rail attachment apparatus from the rail for removing the scaffold tool bucket holder.

Figure 1:
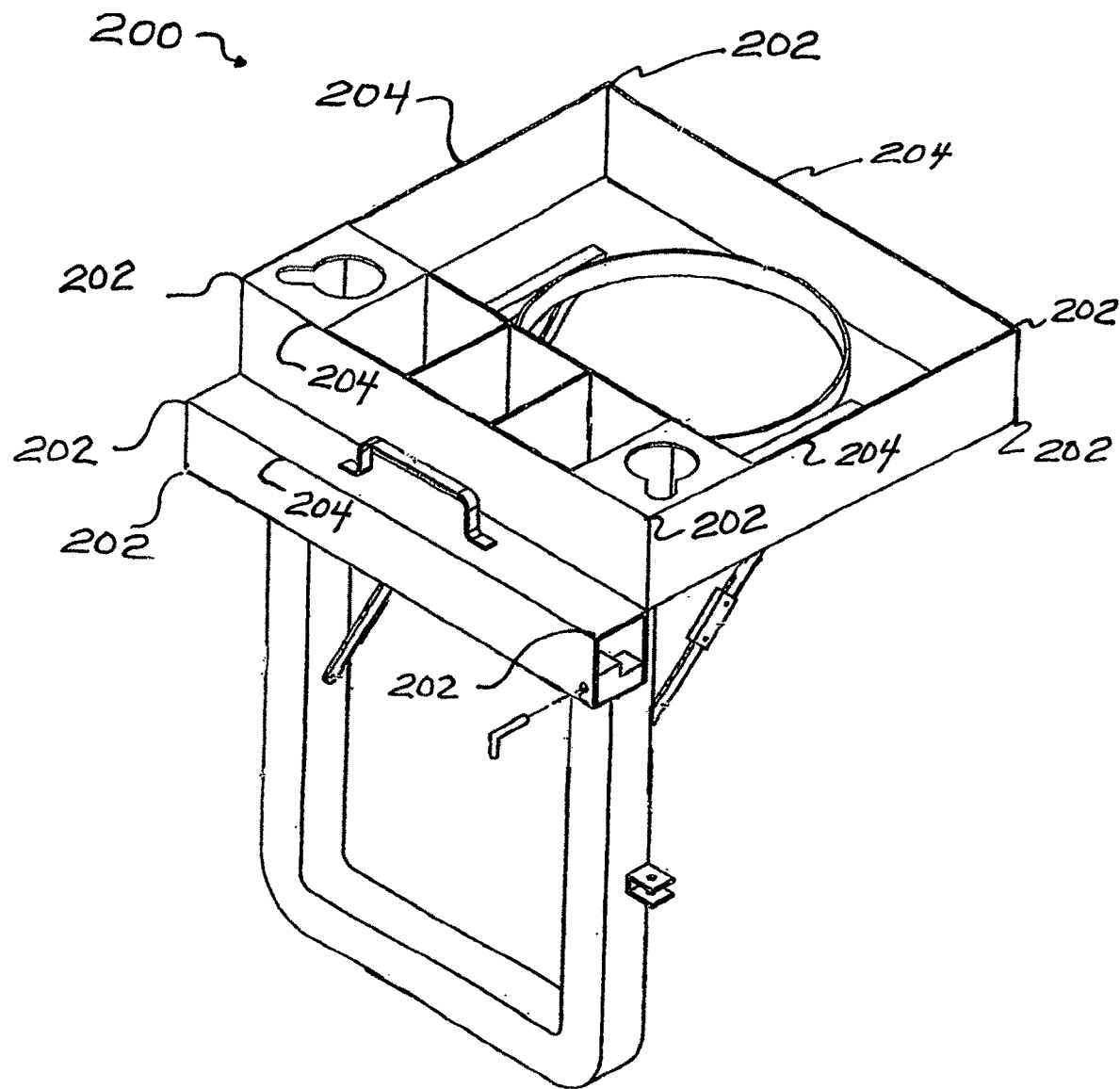
FIG. 1 is a schematic illustration of a prior art scaffold tool bucket holder having sharp exposed edges and corners which can scratch or cut a worker if the worker accidently makes contact with the edge of the holder and having foldable hinges which can pinch a worker's finger causing injury when rotating the stabilizing member into or out of its storage configuration.

It should now be apparent that the scaffold tool bucket holder of the subject invention provides a new and novel device for use in holding work materials for use by a worker by attaching to the rim of scaffold that significant reduces manufacturing costs of conventional tool bucket holders, such as shown in FIG. 1, by utilizing a design that permits a substantial portion of the holder to be easily fabricated by plastic molding processes, that eliminates pinch points, that significantly improves the strength of the stabilizing member over prior art designs.

It should also now be apparent that the scaffold tool bucket holder of the subject invention has all exposed edges and corners rounded so that the likelihood that a worker that inadvertently contacts an edge or corner of the holder will be cut, scrapped, poked or otherwise injured. Further, by manufacturing the base platform from a plastic material, results in a holder that is not only less costly to manufacture but reduces the holder's potential for electrical conductance without the need for insulating materials and produces a holder that is lighter in weight than prior art devices thereby reducing shipping costs and allowing less expensive mass productions as well as providing a design that is significantly less complex in design than prior art designs and does not require the use of struts for providing additional support strength to the stabilizing member. By fabricating the base platform out of plastic does not require the use of top coat finishes, wear strips and the like typically required in metallic scaffold tool bucket holders. In a preferred embodiment the rail attachment apparatus, is in the form of J-shaped hinges that are formed integral with the upwardly extending side wall of the base platform results in a greater decrease in manufacturing costs. Further, such a design allows the base platform to be formed using a single mold plastic manufacturing process and requires less individual parts than prior art devices. It should also now be apparent that the rail attachment apparatus of the subject invention operates such that it can accommodate various sized scaffold rails thereby eliminating the need for fabricating different sized external adaptors. Preferably, the scaffold tool bucket holder comprises a base platform formed from a plastic material and having a planar surface and an opening therein and an upwardly extending side wall extending around the outer periphery of the planar surface; a rail attachment apparatus that operates to attach to the rail of the scaffold for supporting and positioning the base platform on the scaffold rail; and a stabilizing member for providing additional support for the base platform; wherein all of the exposed edges and corners of the scaffold tool bucket holder are rounded to prevent injury to a worker if the worker makes incidental contact with an exposed edge or corner. Preferably, the rail attachment apparatus is in the form of one or more hooks extending upwardly from the upwardly extending side wall and operates to extend over the rail of the scaffold and has rounded attachment surfaces; wherein each one or more hooks include a closure element that operates to accommodate various size rails while providing a secure fit; wherein the top edge of the upwardly extending side wall includes padding material that operates to provide a pliable blunt surface; wherein the stabilizing member comprises a pair of support rails attached to the underside surface of the base platform and a pair of stabilizing rails coupled to the support rails; and wherein the stabilizing rails having a use position such that the stabilizing rails extend downwardly from the support rails and a storage position such that the stabilizing rails are parallel to the support rails.

It should also now be apparent that the scaffold tool bucket holder of the subject invention has a design that reduces or eliminates or reduces potential "pinching" points often encountered by the use of struts, that can injure a worker that exist in prior art devices.

Although the foregoing invention has been described in some detail for purposes of clarity of understandings, it will be apparent that certain changes and modifications may be practiced within the scope of any claims. It should now be apparent that the various embodiments presented can be easily modified while keeping within the scope and spirit of the subject invention. Accordingly, it should be understood that the present disclosure is to be considered as exemplary of the principals of the invention and is not intended to limit the invention to the embodiments and the specific examples illustrated and the invention is not to be limited to the details given herein but may be modified within the scope and equivalents of the descriptions and examples contained herein.

The invention claimed is:

1. A scaffold tool bucket holder for attaching to a rail of a scaffold, the scaffold tool bucket holder comprising:
    a base platform having an underside surface and a planar surface and an opening therein and an upwardly extending side wall extending around the outer periphery of said planar surface;
    a rail attachment apparatus having one or more hooks extending from said side wall for attaching the scaffold tool bucket holder to the rail of the scaffold and for supporting and positioning said base platform on the rail; and
    a stabilizing member for providing additional support for said base platform and having a pair of parallel support rails attached to said underside surface of said base platform and a pair of stabilizing rails rotatably coupled to said support rails;
    wherein said stabilizing rails have a use position such that said stabilizing rails extend downwardly from said support rails and a storage position such that said stabilizing rails are parallel to said support rails;
    wherein all exposed corners and edges of said base platform, said rail attachment apparatus and said stabilizing member are rounded; and
    wherein said opening having a peripheral upper edge and upwardly extending rim surrounding said peripheral upper edge.

2. The scaffold tool bucket holder of claim 1 wherein said one or more hooks has a rounded top surface.

3. The scaffold tool bucket holder of claim 2 wherein said one or more hooks having a closure element that operates to create a snug fit with various sizes of scaffold rails.

4. The scaffold tool bucket holder of claim 1 wherein said upwardly extending side wall includes a top edge surface with padding material that operates to provide a pliable blunt surface.

5. The scaffold tool bucket holder of claim 1 wherein said base platform is formed from a plastic material.

6. The scaffold tool bucket holder of claim 1 wherein said planar surface of said base platform includes a magnetic material that operates to keep working materials in place on said planar surface.

7. The scaffold tool bucket holder of claim 1 wherein said upwardly extending rim is tapered inwardly.

8. The scaffold tool bucket holder of claim 1 wherein said opening having a peripheral lower edge and a downwardly extending rim surrounding said peripheral lower edge.

9. The scaffold tool bucket holder of claim 1 wherein said opening has a diameter of about 10 inches to about 14 inches.

10. A scaffold tool bucket holder for attaching to a rail of a scaffold, the scaffold tool bucket holder comprising:
    a base platform formed from a plastic material and having a planar surface with an outer periphery and an opening therein, wherein an upwardly extending side wall extends around said outer periphery of said planar surface;
    a rail attachment apparatus for attaching to the rail of the scaffold for supporting and positioning said base platform on the rail; and
    a stabilizing member for providing additional support for said base platform;
    wherein said upwardly extending side wall has rounded exposed corners and a rounded top edge;
    wherein said rail attachment apparatus has one or more hooks having a rounded top surface and formed integral with and extending upwardly from said upwardly extending side wall and operate to extend over the rail of the scaffold for attaching the scaffold tool bucket holder to the rail of the scaffold;
    wherein said rail attachment apparatus includes closure element that operates to accommodate various size rails while providing a secure fit;
    wherein said top edge of said upwardly extending side wall includes padding material that operates to provide a pliable blunt surface;
    wherein said stabilizing member comprises a pair of support rails attached to said planar surface and a pair of stabilizing rails coupled to corresponding pair of support rails; and
    wherein said stabilizing rails having a use position such that said stabilizing rails extend downwardly from said planar surface and a storage position such that said stabilizing rails are parallel to said planar surface.

11. The scaffold tool bucket holder of claim 10 wherein said upwardly extending side wall has all rounded exposed corners.

12. The scaffold tool bucket holder of claim 11 wherein said planar surface of said base platform includes a magnetic material that operates to keep working materials in place on said planar surface.

13. A scaffold tool bucket holder for attaching to a rail of a scaffold, the scaffold tool bucket holder comprising:
    a base platform having an underside surface and a planar surface and an opening therein and an upwardly extending side wall extending around the outer periphery of said planar surface;
    a rail attachment apparatus having one or more hooks extending from said side wall for attaching the scaffold tool bucket holder to the rail of the scaffold and for supporting and positioning said base platform on the rail; and
    a stabilizing member for providing additional support for said base platform and having a pair of parallel support rails attached to said underside surface of said base platform and a pair of stabilizing rails rotatably coupled to said support rails;
    wherein all exposed corners and edges of said base platform, said rail attachment apparatus and said stabilizing member are rounded; and
    wherein said opening having a peripheral upper edge and upwardly extending rim surrounding said peripheral upper edge; and
    wherein said upwardly extending rim is tapered inwardly.

14. The scaffold tool bucket holder of claim 13 wherein said opening having a peripheral lower edge and a downwardly extending rim surrounding said peripheral lower edge.

15. The scaffold tool bucket holder of claim 13 wherein said stabilizing rails have a use position such that said stabilizing rails extend downwardly from said support rails and a storage position such that said stabilizing rails are parallel to said support rails.

* * * * *